US008819177B2

(12) United States Patent
Sakairi et al.

(10) Patent No.: US 8,819,177 B2
(45) Date of Patent: Aug. 26, 2014

(54) ADDING PERSONALIZED VALUE TO WEB SITES

(75) Inventors: Takashi Sakairi, Yamato (JP); Takuya Ohko, Machida (JP); Hidemasa Muta, Machida (JP)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/186,953

(22) Filed: Aug. 6, 2008

(65) Prior Publication Data

US 2009/0049120 A1  Feb. 19, 2009

(51) Int. Cl.
*G06F 15/16* (2006.01)

(52) U.S. Cl.
USPC .......................................... 709/218; 709/219

(58) Field of Classification Search
USPC ......................................................... 709/218
See application file for complete search history.

(56) References Cited

U.S. PATENT DOCUMENTS

| | | | |
|---|---|---|---|
| 5,161,105 A * | 11/1992 | Kugimiya et al. | 704/4 |
| 6,938,205 B1 * | 8/2005 | Hanson et al. | 715/234 |
| 7,640,512 B1 * | 12/2009 | Appling | 715/771 |
| 2002/0178007 A1 * | 11/2002 | Slotznick et al. | 704/270.1 |
| 2006/0031404 A1 * | 2/2006 | Kassab | 709/218 |
| 2007/0074188 A1 * | 3/2007 | Huang et al. | 717/141 |
| 2009/0049120 A1 * | 2/2009 | Sakairi et al. | 709/203 |

FOREIGN PATENT DOCUMENTS

WO        WO0048110        *  8/2000  ............. G06F 17/60

* cited by examiner

*Primary Examiner* — Joseph Greene
(74) *Attorney, Agent, or Firm* — Shimokaji & Associates, P.C.

(57) ABSTRACT

The present invention adds new value to the Web, such as to improve accessibility, while maintaining changes to existing web sites to a minimum. An example system includes a first Web server and at least one other Web server, wherein a Web page can be displayed on a Web browser in a client device connected with the first Web server and the other Web server via a network, wherein the first Web server registers URLs of files providing added value for each of the first Web server and the other Web server that are defined as a set of Web servers to be provided with the same added value, and wherein the first Web server and the other Web server display an existing Web page in the Web browser, and provide the added value to the Web page by manipulating a DOM from another frame or another window.

17 Claims, 13 Drawing Sheets

FIG. 8

```
1   <!DOCTYPE HTML PUBLIC "-//W3C//DTD HTML 4.01 Transitional//EN">
2   <HTML>
3   <HEAD>
4   <%@ page language="java" contentType="text/html; charset=SHIFT_JIS" pageEncoding="SHIFT_JIS" %>
5   <META http-equiv="Content-Type" content="text/html; charset=SHIFT_JIS">
6   <TITLE>rakuraku.jsp</TITLE>
7   <SCRIPT type="text/javascript" src="http://w3.trl.ibm.com/RakurakuWeb/rakuraku.js"></SCRIPT>   ← 71
8   </HEAD>
9   <FRAMESET rows="20%, *, 30%, 0%">
10    <FRAME src="controller.html" name="controllerFrame" onload="'init(controllerFrame)'">
11    <FRAME src="<%=request.getParameter("href") %>" name="contentsFrame" onload="'init(contentsFrame)'">
12    <FRAME src="magnifier.html" name="magnifierFrame">
13    <FRAME name="personalizedDataFrame">
14    <NOFRAMES>
15    <BODY>
16    <P>This page uses frames. The current browser you are using does not support frames.</P>
17    </BODY>
18    </NOFRAMES>                                                                                    ← 72
19  </FRAMESET>
20  </HTML>
```

FIG. 9

```
1  var RAKURAKU_JSPS = new Object();
2  RAKURAKU_JSPS["w3.trl.ibm.com"] = "http://w3.trl.ibm.com/RakurakuWeb/rakuraku.jsp";
3  RAKURAKU_JSPS["w3.watson.ibm.com"] = "http://w3.watson.ibm.com/RakurakuWeb/rakuraku.jsp";
4  RAKURAKU_JSPS["w3.almaden.ibm.com"] = "http://w3.almaden.ibm.com/RakurakuWeb/rakuraku.jsp";
```

FIG. 13

```
function getEventSource(myWindow, e) {
    var src;

if (typeof(myWindow.event) != "undefined") {        // Internet Explorer
        src = myWindow.event.srcElement;
    } else {
        src = e.target;
    }
    return src;
}
```

ADDING PERSONALIZED VALUE TO WEB SITES

CROSS REFERENCE TO RELATED APPLICATIONS

This application claims the priority benefit of the following foreign application: Japanese application JP 2004-377805, filed Dec. 27, 2004.

FIELD OF THE INVENTION

The present invention relates to a network system that can display a Web page with a Web browser connected with Web sites via a network, and more specifically to a system or the like for adding a personalized value to Web sites.

BACKGROUND ART

The Accessibility to a Web page is drawing attention these days. This is a technique for enabling all the web users to access information provided on the Web and to use the contents and functions there without any restriction of age, physical handicaps or using environment.

The following documents are considered:
[Non-Patent Document 1] "Internet browsing support software "rakuraku-web-sansaku" (online), Japan IBM (searched on Dec. 14, 2004) Internet URL:
<http://www.reserch.
followed by: ibm.com/trl/news/
followed by: ibm_users/trltech_11.htm>
[Non-Patent Document 2] "software ZoomSight (zoom sight)" (online), Hitachi Government & Public Corporation System Engineering, Ltd. (searched on Dec. 14, 2004), Internet URL"
<http://www.gp.
followed by: hitachi.co.jp/eigyo/
followed by: product/zoomsight/>
[Non-Patent Document 3] "[InetSDK] "access rejection" in a script over frames" (online), Microsoft.com.Japan site (searched on Dec. 14, 2004), Internet URL:
<http://support.
followed by: micicrosoft.com/
followed by: default.aspx?scid=kb;JA;167796>
[Non-Patent Document 4] "Document Object Model (DOM) Level 2 HTML Specification Version 1.0" (online), W3C Recommendation (searched on Dec. 14, 2004), Internet URL:
<http://www.w3.
followed by: org/TR/2003/
followed by: REC-DOM-Level-2-HTML-20030109/>
[Non-Patent Document 5] "(InetSDK) create a page that achieves cross-frame-script with an HTML application" (online), Microsoft.com.Japan site (searched on Dec. 14, 2004), Internet URL:
<http://support.
followed by: microsoft.com/default.
followed by: aspx?scid=kb;ja;241754>
[Patent Document 1] National Publication of International Patent Application No. 2003-520361
[Patent Document 2] Published Unexamined Patent Application No. 2004-103022

With a relating conventional technique, a user needs only to move a mouse pointer to the first part of a paragraph of a desired article on a Web site to make the part automatically read aloud and the characters zoomed. For example, see Non-Patent Document 1. The technique of this Non-Patent Document 1 also enables a user to change the speed of the reading sound or adjust the volume. It also enables a user with weak eyesight or cataract to change the color or the background color of the characters to help the user to read easily. This software has various schemes to eliminate user's troubles of installing this software into a PC (Personal Computer). For example, when a PC user agrees to the license agreement first appearing on the screen, ActiveX (registered trademark) object automatically starts and checks the presence of prerequisite software and automatically downloads or sets up this software. This enables a user to use this software immediately without having trouble. This software enables what displayed on the screen to be zoomed or read aloud without changing the existing web site. As a technique for taking account of Accessibility by using JavaScript (registered trademark) or ActiveX, the technique described in Non-Patent Document 2 may be also considered.

There is a conventional technique for increasing a range for a domain by setting the domain with JavaScript (for example, see Non-Patent Document 3). This technique enables only a page hosted in the same domain to safely script the contents thereof as implementation of security across frames. When
document.domain="ibm.com";
is executed in each document, the documents at w3.trl.ibm.com and those at w3.watson.ibm.com can control each other.

According to Non-Patent Document 4, document.domain cannot be set, though this can be set by a browser such as Internet Explorer (registered trademark) or Mozilla (registered trademark) in the above manner.

There is a conventional technique for avoiding security restriction by making an extension to a file .hta (for example, see Non-Patent Document 5).

There is a technique described in an official gazette that a user prepares a personalized server that enables the user achieve common personalization by using the personalized server in accessing a plurality of web sites (for example, see Patent Document 1).

Another official gazette discloses a technique for enabling a user to access a web site by using the same Cookie for a plurality of clients with the Cookie saved on a server side (for example, see Patent Document 2).

Problems to be Solved by the Invention

As the techniques described in Non-Patent Document 1 and 2 use ActiveX, they have to use Windows (registered trademark) for an OS (Operating System) and Internet Explorer for a Web browser. These techniques lack in versatility as they do not allow using any other OS or browser.

A method for setting a domain by using Non-Patent Document 3 has to change each Web page to execute JavaScript. It is troublesome for a user to change all the Web pages on the Web site. This method has another problem in that it cannot be applied to the highly related sites unless they have the same second level domain.

A method using Non-Patent Document 5 requires Windows to be used for an OS, allowing none of the other OS to be used. The method also has another problem in that it avoids all the restrictions of security and therefore allows an HTML application to be used only on the site a user really trusts.

With a method described in Patent Document 1, a server saves user's private information. As leakage of private information is a social problem these days, however, a server is required to have a system configured for managing the private information and carefully manage the information to prevent it from being leaked when the server saves private information. What should be noticed here is that it is not enough to have a system configured for managing information with a technique such as authentication. In most cases of private information leakage, a person with an authority to access private information wrongly leaks the private information. It is thus quite risky to save private information on a server. In addition, as information on each user is saved on a server, the method has another problem in that the amount of data to be saved increases as the number of users increases.

A method described in Patent Document 2 has a problem in that a plurality of Web sites cannot share information for personalization. This method also has the similar problem as that described for Patent Document 1, as the method saves private information on a server.

As such, it is more and more required to add a new value to the existing Web site without modifying the site in order to improve accessibility. It is preferable to use a technique including JavaScript that can be used in many client environments and not to use a technique restricted only to a particular client environment such as ActiveX. In order to control another frame or another window by using JavaScript, however a user can only control the frame or the window only if the frame or the window is in the same domain due to security restriction of the Web browser. Therefore, even with such a technique, a value cannot be uniformly added to a plurality of web sites.

When the added value provided for a Web page like this can be personalized, the value can be improved. The method for saving information for personalization on a server and the method for saving information for personalization in a Cookie on a client can be used. In order to manage private information on a server, a system for managing the information has to be built and the management should be done carefully so as not to leak the information. If information for personalization is saved in a Cookie, it needs not be saved in a server. In this method, however, domains cannot share information for personalization.

SUMMARY OF THE INVENTION

The present invention is made to overcome the abovementioned problems in the conventional techniques. An aspect of the present invention is to provide added value, such as by improving accessibility with minimum change to the existing Web sites.

Another aspect of the present invention is to prevent an environment of a client from depending on a particular OS or Web browser.

Another aspect of the present invention is to enable a user to use new added value without problems, even when a page is transferred among related Web sites.

Another aspect of the present invention is to share information for personalization among related Web sites without saving the information on a server.

The present invention adds new value by adding content to existing Web sites without modifying existing content. The present invention may be characterized in that when a Web page has a link to a Web page of the other Web server to be provided with the same added value and the page is loaded in a frame, the first Web server and the one or more second Web servers changes DOM so that the page is transferred to a URL that provides an added value on the other Web server.

On the other hand, the present invention is a main Web server within Web servers for providing the same added value to Web browsers connected with a network, which includes: storage means for storing original web contents specific to a device, generation means for generating a document file with a frame for providing the added value, and sending means for sending a document file to be referenced from a document file generated at the Web servers for causing the Web browser to implement the added value. Thus, according to the present invention, new added value, such as to improve accessibility, can be provided without substantially changing existing web sites.

BRIEF DESCRIPTION OF THE DRAWINGS

These, and further, aspects, advantages, and features of the invention will be more apparent from the following detailed description of a preferred embodiment and the appended drawings, wherein:

FIG. 8 is a diagram showing JSP codes for the example shown in FIG. 7;

FIG. 9 is a diagram showing an example of JavaScript codes for registering a domain of a Web server with the same added value and a URL of JSP;

FIG. 13 is a diagram showing JavaScript codes of a function for obtaining a source of an event.

DESCRIPTION OF SYMBOLS

Figure 1:
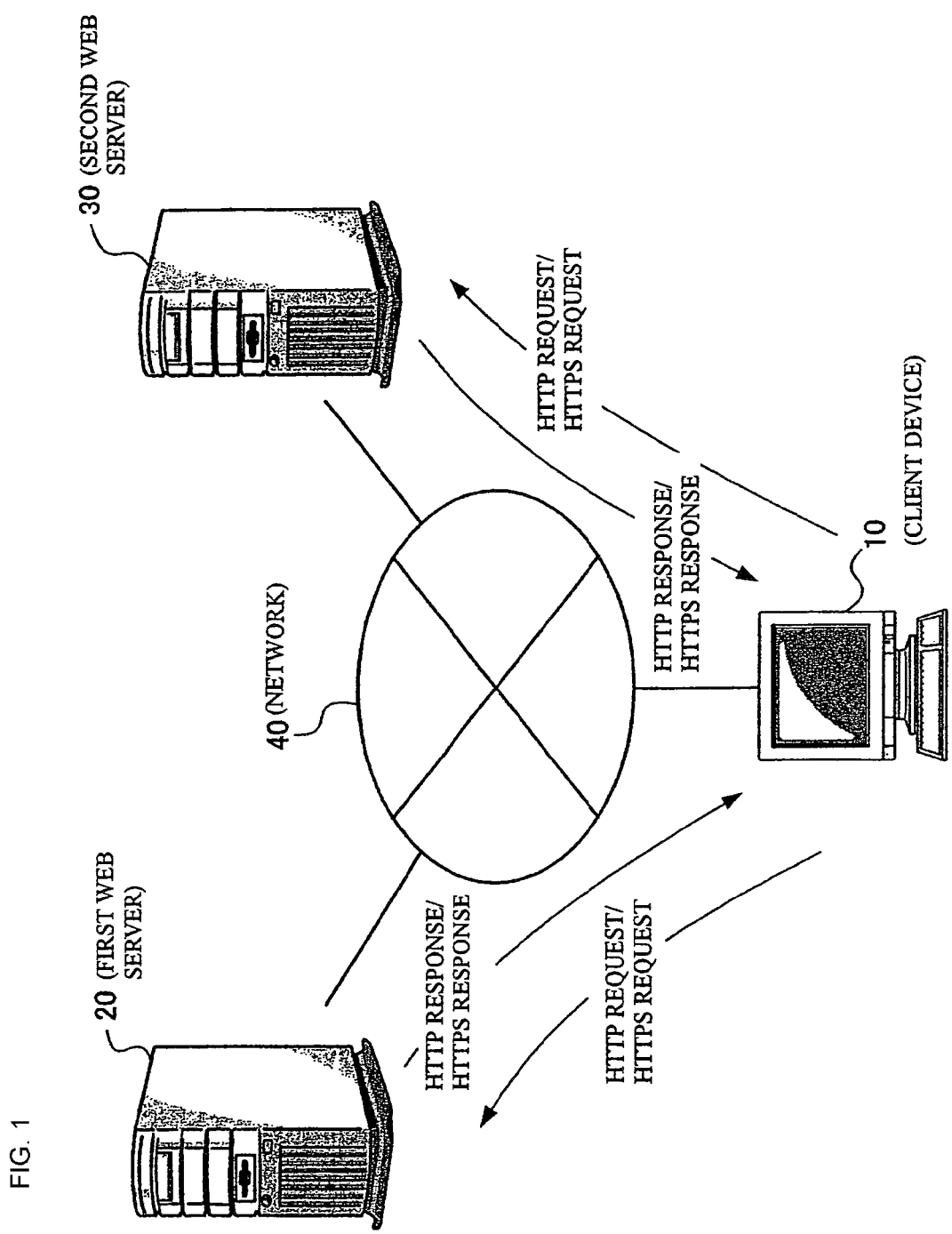
FIG. 1 is a diagram showing an entire configuration of a network system applied with the embodiment.

10 . . . Client device
11 . . . Web browser
12 . . . Cookie
20 . . . The first Web server
21 . . . HTTP/HTTPS processing part
22 . . . Added value HTML generation part
23 . . . Personal information processing part
24 . . . Domain registration processing part
25 . . . Original contents
26 . . . Registration domain information
27 . . . Added value processing part
30 . . . The second Web server
31 . . . HTTP/HTTPS processing part
32 . . . Added value HTML generation part
33 . . . Personal information processing part
35 . . . Original contents
40 . . . Network 51 . . . Controlling part
52 . . . Contents part
53 . . . Added value part
54 . . . Personal information management part

DETAILED DESCRIPTION OF THE INVENTION

The present invention provides methods, apparatus and systems to add new value (to provide added value) to the existing Web sites, such as by improving accessibility with minimum change. The present invention provides methods, apparatus and systems to prevent an environment of a client from depending on a particular OS or web browser. The present invention provides methods, apparatus and systems to enable a user to use a new added value without a trouble even when a page is transferred among related Web sites. The present invention provides methods, apparatus and systems to share information for personalization among related Web sites without saving the information on a server.

In an embodiment, the present invention adds new value by adding a few contents to existing Web sites without modifying existing contents. For the purpose, in the present invention, a set of Web sites to be provided with the same added value is defined and a URL for providing the added value for each web site is registered. The present invention provides the added value by displaying existing Web pages in a Web browser and manipulating DOM for the Web page from another frame or another window. When the Web page has a link to a Web page of a Web site to be provided with the same added value, DOM is changed so that when the page is loaded in a frame the page is transferred to a URL that provides an added value on the web site. Information for personalization is characterized in that a Web site for managing a Cookie is selected from a set of Web sites to be provided with the same added value so that the Cookie is accessed through the selected site.

That is to say, the present invention is characterized by a system including a first Web server and one or more second Web servers, wherein a Web page can be displayed on a Web browser in a client device connected with the first Web server and the one or more second Web servers via a network. The system includes: means for registering URLs of files providing an added value for each of the first Web server and the one or more second Web servers that are defined as a set of Web servers to be provided with the same added value in the first Web server, and means for providing the added value to the Web page by displaying existing Web pages of the first Web server and the one or more second Web servers in the Web browser and manipulating an API (Application Program Interface) such as DOM from another frame or another window.

The present invention may be characterized in that when a Web page has a link to a Web page of the other Web server to be provided with the same added value and the page is loaded in a frame, the first Web server and the one or more second Web servers changes DOM so that the page is transferred to a URL that provides an added value on the other Web server. The present invention may also be characterized in that a particular Web server from the first Web server and the one or more second Web servers manages a Cookie and information for personalization relating to the added value accesses the Cookie through the particular Web server. The first Web server is described below as being selected as a particular Web server for managing the Cookie.

From another point of view, a system to which the present invention is applied is characterized by having means in each of the first Web server and the one or more second Web servers for storing web contents specific to the first Web server and the one or more second Web servers respectively, and generating a document file such as HTML using a frame to provide an added value for the web contents wherein the first Web server has a document file for the document file generated at the first Web server and the second Web server(s) to reference and for causing the Web browser to implement an added value.

The first Web server may have a feature that it sends a document file containing a script program such as JavaScript for reading a Cookie to the Web browser when the URL passed from the Web browser as a parameter is for a domain previously registered as a set of Web servers to be provided with the same added value. The second Web server may have a feature that it sends a document file containing a script program to the Web browser based on the information on a Cookie passed from the Web browser as a parameter. The added value may be for improving accessibility. As an added value, displaying of a translation, Furigana (the reading of a Chinese character by writing kana (Japanese character) at its side) or a full description for acronym or abbreviation can be considered.

On the other hand, the present invention is a main Web server within Web servers for providing the same added value to Web browsers connected with a network, which includes: storage means for storing original web contents specific to a device, generation means for generating a document file with a frame for providing the added value, and sending means for sending a document file to be referenced from a document file generated at the Web servers for causing the Web browser to implement the added value.

The Web server may also be characterized by further comprising means for registering domains of the Web servers defined as the set of Web servers to be provided with the added value and a URL of a script program that provides the added value. The Web server may also be characterized by further comprising second sending means for determining whether the URL passed from the browser as a parameter is one of those for previously registered domains of the Web servers or not, and sending a document file containing a script program for reading a Cookie, which is provided by the system, to the browser on the condition that the URL is previously registered one. The Web server may be characterized by further comprising third sending means for, when a request for a script program for writing the Cookie is received from the Web browser that displays a Web page of another Web server that is one of the Web servers, sending a document file containing the script program for writing the Cookie to the Web browser.

From a view point of a category of method, the present invention is a method for providing an added value without modifying existing web contents in a system having Web servers connected with a Web browser via a network, which includes steps of storing previously domains of Web servers defined as a set to be provided with the same added value and a URL of a script program for providing the added value in memory of a particular computer that is one of the Web servers; and checking whether or not a URL passed from the Web browser as a parameter has been previously stored in the memory, and sending a document file containing a script program for reading a Cookie to the Web browser on condition that the URL has been previously stored in the memory.

The method may also be characterized in that the added value referenced from document files of the Web servers and specific to an application is implemented on the Web browser. The method may also be characterized in that, when a request for a script program for writing a Cookie is received from the Web browser that displays a Web page of another Web server that is one of the Web servers, the method includes a sending step of sending a document file containing the script program for writing the Cookie to the Web browser.

A program product to which the present invention is applied causes a computer functioning as a Web server for providing an added value without modifying existing web contents in a system having Web servers connected with a Web browser via a network to previously store domains of Web servers defined as a set to be provided with the same added value and a URL of a script program for providing the added value in memory of the computer, check whether the URL passed from the Web browser as a parameter has been previously stored in the memory or not, and send a document file containing a script program for reading a Cookie to the Web browser if the URL has been previously stored in the memory, and, when a request for a script program for writing the Cookie is received from the Web browser that displays a Web page of another Web server that is one of the Web servers, send a document file containing the script program for writing the Cookie to the Web browser.

From another viewpoint, the program product to which the present invention is applied causes the computer to provide the added value to the Web page by displaying an existing Web page in the Web browser and manipulating DOM from another frame or another window, and if the Web page has a link to a Web page of another Web server to be provided with the added value, change an attribute of "A" tag by manipulating DOM to transfer to a URL for providing the added value on the other Web server in response to loading a Web page in a frame.

When the programs are provided for a computer that functions as a Web server, such a program is provided on a computer-readable storage medium. The embodiment that the program is installed on a Web server may also be considered. As a storage medium, various types of DVD or CD-ROM medium can be used, for example. A program is read by the various types of DVD or CD-ROM medium readers and stored in a flush ROM or the like and executed by a CPU. The program may be provided over a network with a program transmitting device.

Particular embodiments of the present invention will be described with reference to attached drawings. FIG. 1 is a diagram showing an entire configuration of a network system to which the embodiment is applied. The network system shown in FIG. 1 includes a client device 10 for accessing a Web server and being provided with a Web page with added value such as accessibility, and a first Web server 20 and a second Web server 30 for providing a Web page with added value. Each of the devices is connected with a network 40 which is based on WWW (World Wide Web) such as the Internet. A user of the client device 10 outputs HTTP (Hypertext Transfer Protocol) requestor HTTPS (Hypertext Transfer Protocol over SSL) request by using a Web browser (described later) to request a Web page with added value from the first Web server 20 and the second Web server 30. The first Web server 20 and the second Web server 30 send the Web pages with added value to the Web browser of the client device 10 in the form of HTTP response/HTTPS response. Which of the HTTP or the HTTPS is used as a protocol depends on a protocol used by the abovementioned existing Web site, which is given the added value.

Figure 2:
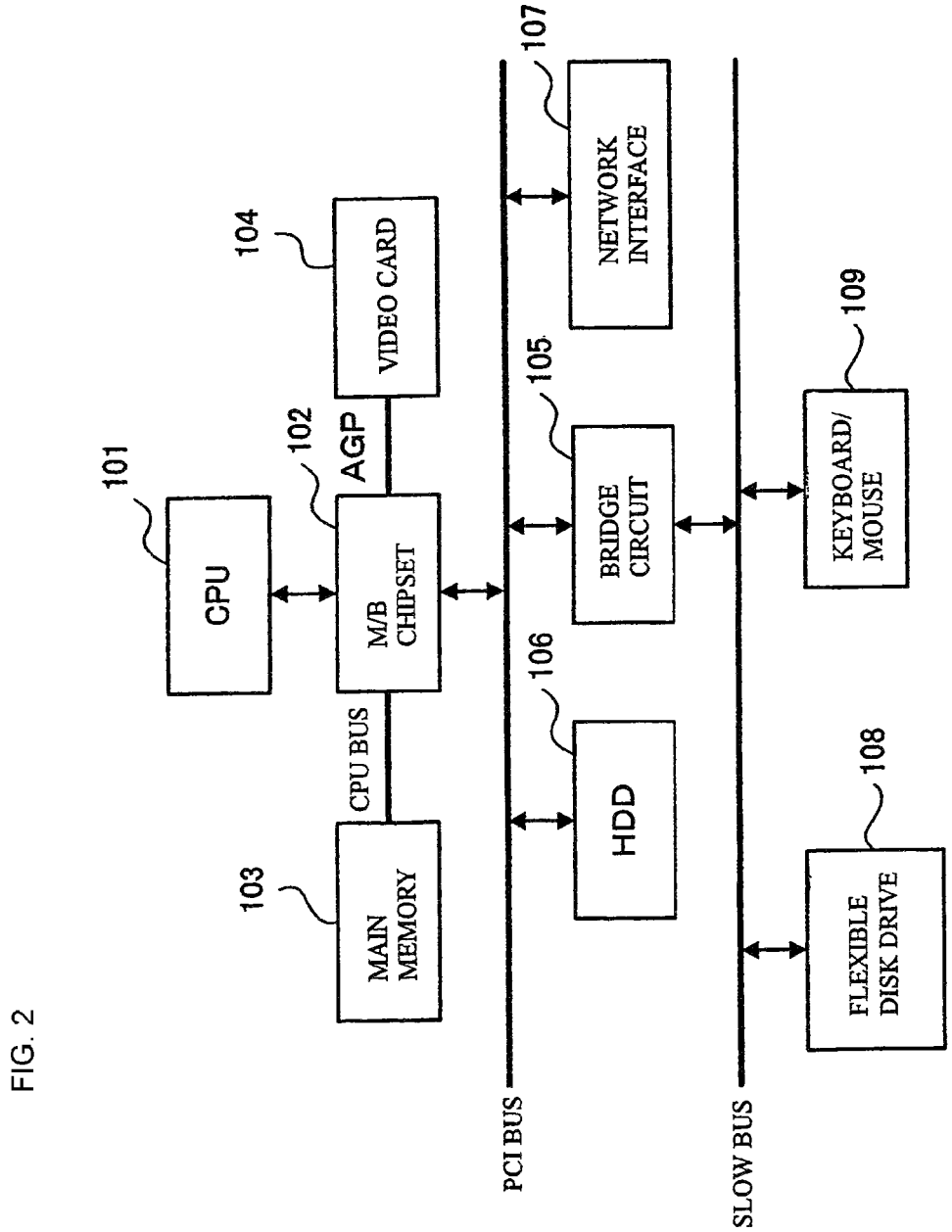
FIG. 2 is a diagram schematically showing a hardware configuration of a computer unit preferable for implementing the client device, the first Web server and the second Web server.

FIG. 2 is a diagram schematically showing a hardware configuration of a computer unit preferable for implementing the client device 10, the first Web server 20 and the second Web server 30. The client device 10, the first Web server 20 and the second Web server 30 include a CPU (Central Processing Unit) 101 as calculation means, main memory 103 connected with the CPU 101 via an M/B (Motherboard) chipset 102 and a CPU bus and a video card 104 connected with the CPU 101 via the M/B chipset 102 and an AGP (Accelerated Graphics Port). They also include a hard disk drive (HDD) 106 connected with the M/B chipset 102 via a PCI (Peripheral Component Interconnect) bus and a network interface 107. They also include a flexible disk drive 108 and keyboard/mouse 109 connected with the M/B chipset 102 from the PCI bus via a bridge circuit 105 and a slow bus such as an ISA (Industry Standard Architecture) bus.

FIG. 2 merely shows a hardware configuration of a computer unit implementing the embodiment, and other types of configuration may be used, if only they are usable with the embodiment. For example, the configuration mounted with video memory only in place of the video card 104 and make the CPU 101 process image data, or the configuration provided with a drive as an external storage such as a CD-R (Compact Disk Recordable) drive or a DVD-RAM (Digital Versatile Disc Random Access Memory) drive via an interface such as an ATA (AT Attachment) or SCSI (Small Computer System Interface) is usable.

Figure 3:
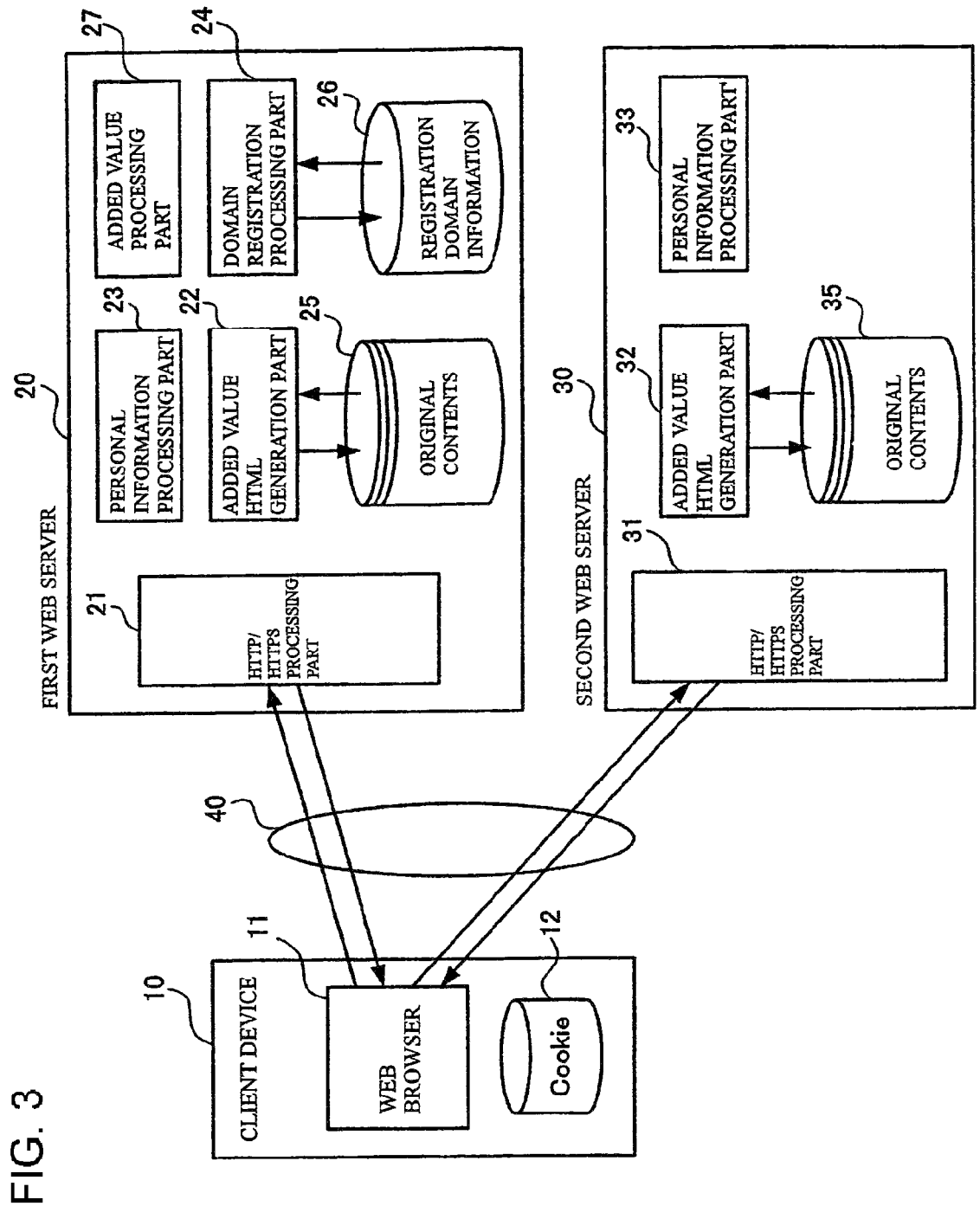
FIG. 3 is a diagram showing a function of each device executed by using the hardware shown in FIG. 2 in the system shown in FIG. 1.

FIG. 3 is a diagram showing a function of each device executed by using the hardware shown in FIG. 2 in the system shown in FIG. 1. The client device 10 includes a Web browser 11, which is software executed at the CPU 101 by using the main memory 103 as a work area and accesses information existing on a Web server such as the first Web server 20 or the second Web server 30 via the network 40 by using the network interface 107. The client device 10 also includes a Cookie 12 as a mechanism for communicating information such as user information or an access history between the Web browser 11 and a Web server (the first Web server 20 or the second Web server 30). The Cookie 12 of the embodiment saves header contents managed by the first Web server 20 in the local HDD 106 on the client device 10 in the form of text file.

The first Web server 20 and the second Web server 30 provide for existing Web sites with added value such as accessibility and are connected with the network 40. The first Web server 20 functions as a main single Web server, for example. The second Web server 30 is composed of a single or a plurality of subordinate Web servers, for example. The first Web server 20 includes an HTTP/HTTPS processing part 21, an added value HTML generation part 22, a personal information processing part 23, a domain registration processing part 24, and an added value processing part 27 for processing an added value specific to an application, as software executed in the CPU 101 by using the main memory 103 as a work area. The HDD 106 stores an original contents 25 and registration domain information 26. The information to be stored in the HDD 106 is stored and read out according to instructions from various types of software executed in the CPU 101.

The second Web server 30 includes an HTTP/HTTPS processing part 31, an added value HTML generation part 32, and a personal information processing part 33, as software to be executed. The HDD 106 stores original contents 35.

The HTTP/HTTPS processing parts 21 and 31 receive an HTTP request/HTTPS request from the Web browser 11 of the client device 10 and sends an HTTP response/HTTPS response to the Web browser 11. The added value HTML generation part 22 and 32 are programs to be executed at the Web server for generating a document file such as HTML using a frame for providing an added value. The Web servers (the first Web server 20, the second Web server 30) have the added value HTML generation part 22 and 32, respectively. A personal information processing part 23 of the first Web server 20 executes various types of processing for writing a Cookie to be managed by the first Web server 20. The personal information processing part 33 of the second Web server 30 executes various types of processing for sending HTML containing a script program such as JavaScript for conveying Cookie information passed from the Web browser 11 as a parameter. As the registration domain information 26 of the first Web server 20, code information of JavaScript for registering domains of the Web servers with the same added value and URLs of JSPs (JavaServer Pages) is stored. The domain registration processing part 24 checks whether the URL passed as a parameter is one of those for previously registered domains or not based on the code information stored in the registered domain information 26. As the original contents 25 and 35, original contents specific to each Web server are stored. The added value processing part 27 executes processing of an added value such as zooming up a text indicated by a mouse pointer in another frame in response to a movement of a mouse. The added value processing part 27 is made of programs referenced from HTML generated by all the Web servers including the first Web server 20 and the second Web server 30 and executed by the Web browser 11.

A user of the client device 10 requests a Web page with an added value such as accessibility from the first Web server 20 in the form of the HTTP request/HTTPS request by using the Web browser 11. The HTTP/HTTPS processing part 21 of the first Web server 20 sends a Web page with the added value to the Web browser 11 in the form of the HTTP response/HTTPS response. The Web browser 11 that received the Web page with the added value may not only simply display the web page but also execute a function for accessibility. As an added value, zooming and displaying in another frame or reading aloud the information indicated by a user with a mouse. In the embodiment, a function of an added value can be personalized. For example, with such an added value, a user can designate a magnification for zooming up the information, which the user indicates with a mouse, to be displayed in another frame. This information is saved by the Cookie 12 managed by the first Web server 20.

A user of the client device 10 moves to another Web page by clicking a mouse button on a link on the Web page. If the destination Web page is on the Web server 20 or on a Web server with the same added value as that registered in the registration domain information 26 of the first server 20, the user can use the same added value at the destination Web page. For example, when a user clicks a mouse button on a link to a Web page on the second Web server 30 displayed on the Web browser 11, a Web page with an added value such as accessibility is requested to the second Web server 30 in the form of HTTP request/HTTPS request. Both the first Web server 20 and the second Web server 30 register that they have the same added value. The HTTP/HTTPS processing part 31 of the second Web server 30 sends a Web page with an added value to the Web browser 11 in the form of HTTP response/HTTPS response.

Figure 4:
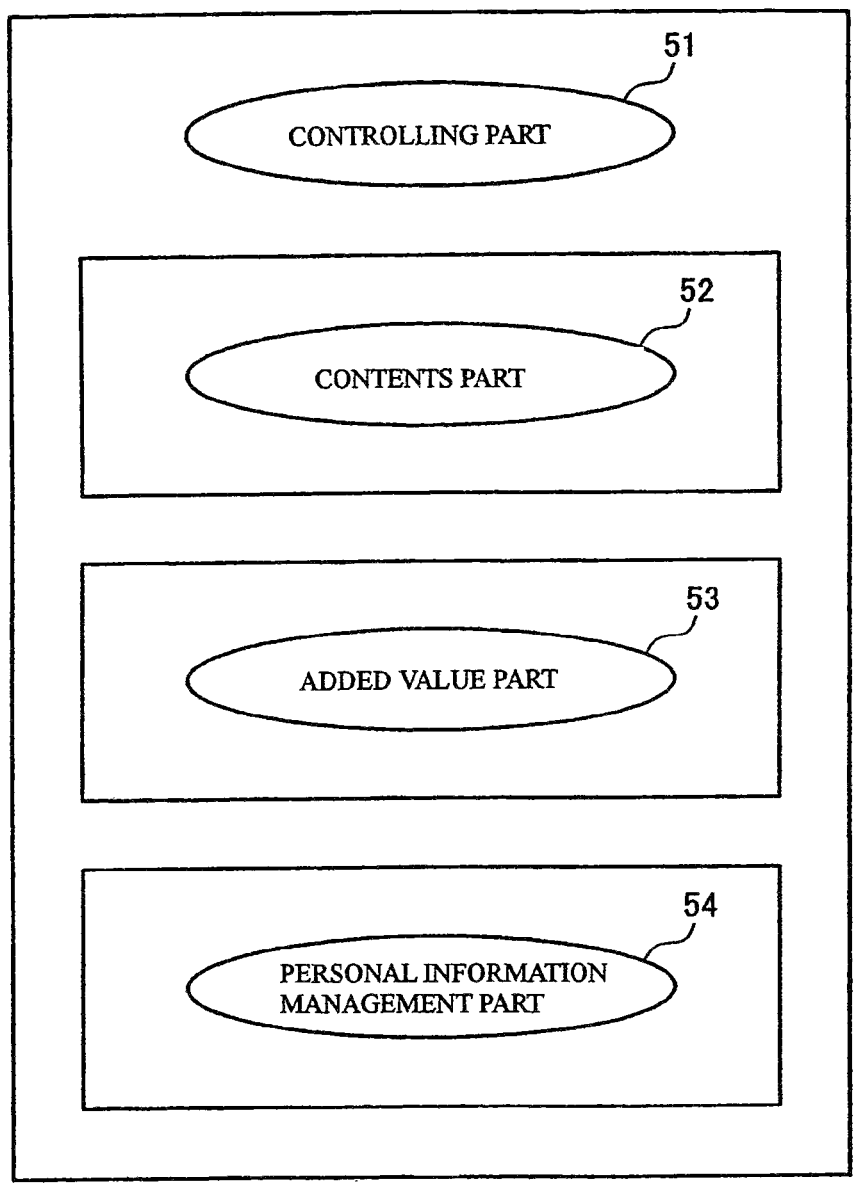
FIG. 4 is a block diagram showing a configuration of the Web browser.

FIG. 4 is a block diagram showing a configuration of the Web browser 11. Frameworks shown in FIG. 4 indicate HTML with frames. A JavaScript code is written for each of the HTML in the frames. The Web browser 11 includes a controlling part 51 for controlling for added values, a contents part 52 displayed with raw Web contents, an added value part 53 for adding a new value to a Web page on an existing Web site, and a personal information management part 54 for saving personal information on a client by a Cookie 12.

When a Web page is read in the contents part 52, the controlling part 51 performs an initial processing necessary for the raw Web page in the contents part 52. This initial processing is performed during "onload", which is set in FRAME tag for the contents part 52. "Onload" shows that those included in the linked contents has been read in. According to "W3C Recommendation 24 Dec. 1999, HTML 4.01 Specification", an event handler "onload" cannot be set in FRAM tag, though, it can be set even in Internet Explorer or Mozilla in this manner.

Three processes are performed in this initial processing.

1. When the Web page has a link to a Web page on the Web site with the same added value, a link is changed to the link with the same added value.

2. Add CSS (Cascading Style Sheets) for dynamically changing the style of the contents part.

3. Set an event handler in the contents part to provide for an added value function.

For example, when a mouse is placed on or leaves from each DOM (Document Object Model) element of HTML, a process for each case can be performed if that event handlers onmouseover and onmouseout have been set.

A Web page on an existing Web site displayed on the contents part 52 is displayed as a frame of the Web browser 11. When the Web page is read in, an event handler is set by the controlling part 51. The event handler set here changes a display of the contents part 52 and the added value part 53 by using Dynamic HTML as required. JavaScript is preferably used as a programming language for describing an event handler, as it operates in widely used Web browsers. The embodiment, however, is not limited to use JavaScript as an event handler. If another programming language is developed to operate on many Web browsers in future, the new programming language can also be used.

The added value part 53 is displayed as a frame or another window, or both of them. The number of the frame or the other window may be plural. For a simple function, the added value part 53 can be implemented only with HTML and JavaScript. For more complicated function, the added value part 53 uses Java applet or the like.

Figure 5:
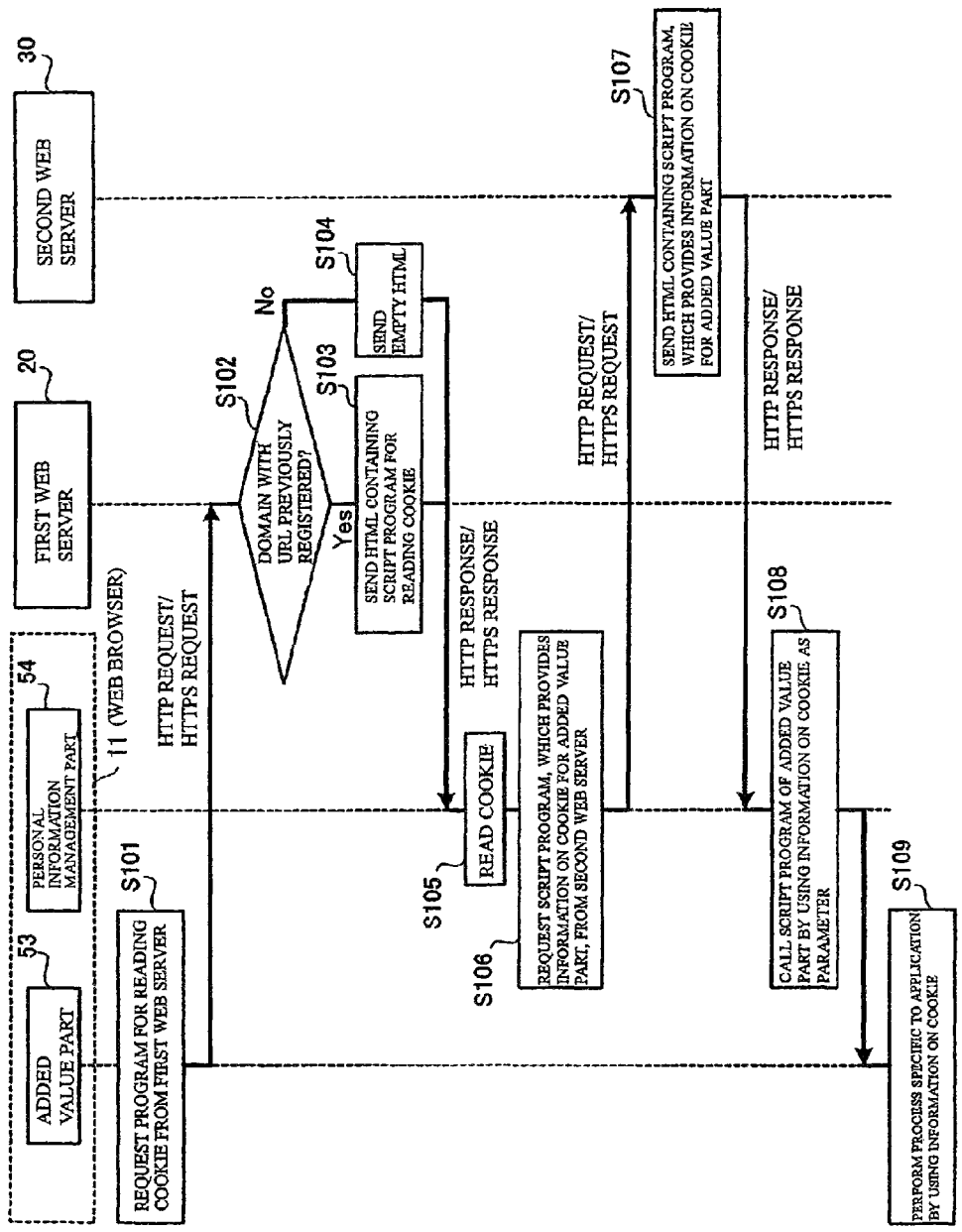
FIG. 5 is a diagram showing a method for reading a Cookie managed by the first Web server from a Web page sent from the second Web server.
Figure 6:
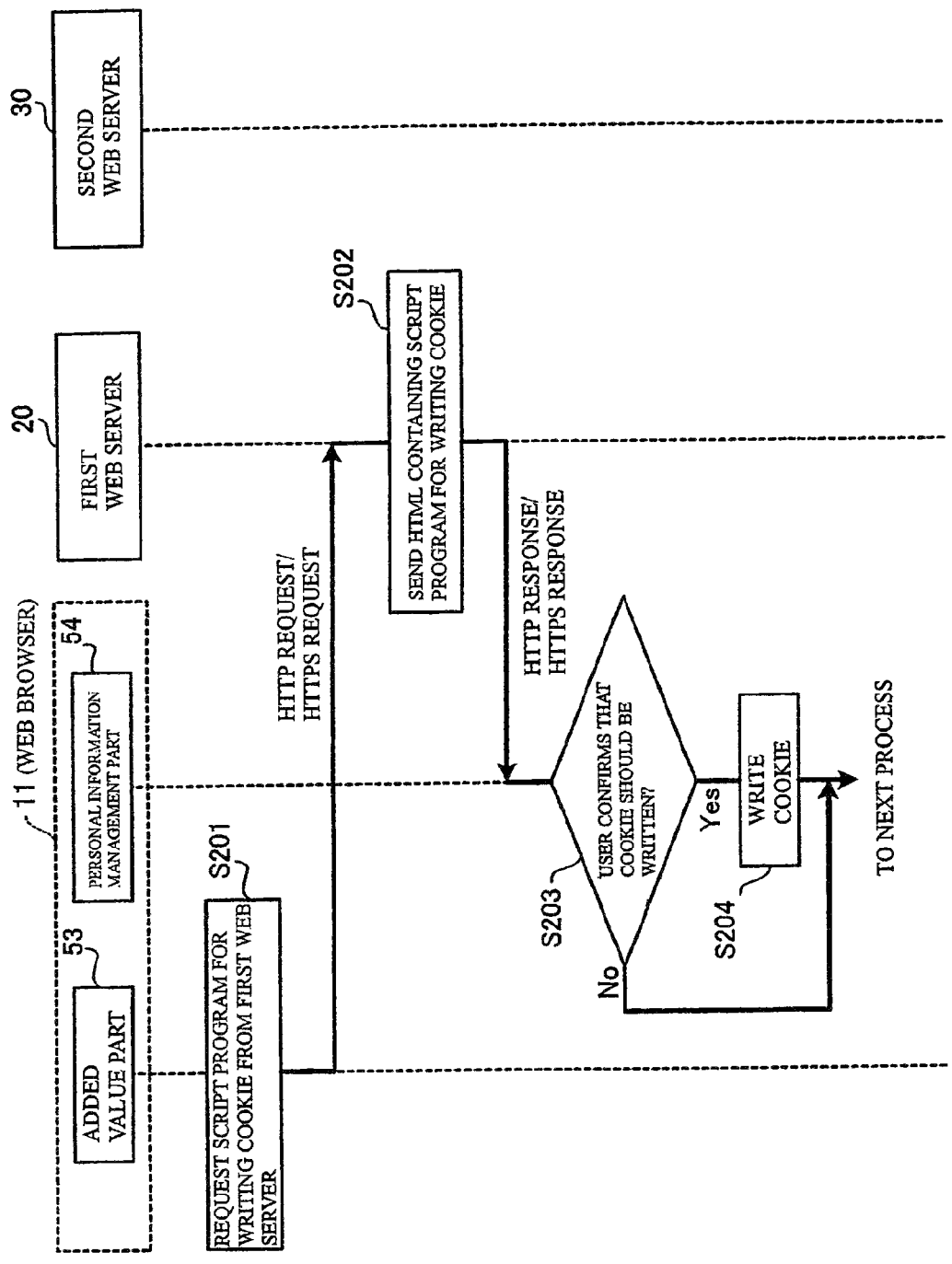
FIG. 6 is a diagram showing a method for writing a Cookie to be managed by the first Web server from a Web page sent from the second Web server.

The personal information management part 54 saves personal information at client by a Cookie and implemented as a frame with size set to 0. Now, a flow of processing performed by the functions will be described. FIG. 5 is a diagram showing a method for reading a Cookie managed by the first Web server 20 from a Web page sent from the second Web server 30. In FIGS. 5 and 6 (described later), a particular Web server for managing a Cookie is treated as the first Web server 20 and the other Web servers are treated as the second Web server 30. The added value part 53 of the Web browser 11 requests HTML, which contains a script program for reading a Cookie, from the first Web server 20 in the form of HTTP request/HTTPS request to the first Web server 20 (step 101). A frame for the personal information management part 54 is designated as a target here. A URL, which is a destination of the HTTP request/HTTPS request from the personal information management part 54 to the second Web server 30, is passed as a parameter.

The domain registration processing part 24 of the first Web server 20, which received the HTTP request/HTTPS request, checks whether the URL passed as a parameter is for a previously registered domain or not based on the registration domain information 26 stored in the HDD 106 (step 102). If it is registered, the first Web server 20 sends HTML containing a script program in the form of HTTP response/HTTPS response (step 103). The script program describes codes for reading a Cookie and sending the value to the URL passed as a parameter. If the HTTP request/HTTPS request is not registered, the first Web server 20 sends empty HTML (step 104).

The personal information management part 54 reads a Cookie by executing the sent script program (step 105). Then, the personal information management part 54 requests a script program, which provides information on the read Cookie for the added value part 53, from the second Web server 30 (step 106). The personal information management part 54 designates a frame of the personal information management part 54 as a target. The personal information management part 54 also passes information on the read Cookie as a parameter.

The second web server 30, which received the HTTP request/HTTPS request, sends HTML containing a script program, which provides information on the Cookie passed as a parameter for the added value part 53 in the form of HTTP response/HTTPS response (step 107). The script program describes codes for calling a function of a script program of the added value part 53 by using the information on the Cookie as an argument.

When the personal information management part 54 receives the HTTP response/HTTPS response from the second Web server 30, a Web page sent from the second Web server 30 is displayed on both of a frame for the personal information management part 54 and a frame for the added value part 53. Therefore, the personal information management part 54 can call a script program of the added value part 53 by using the information on the Cookie as a parameter (step 108) and inform the added value part 53 of the Cookie managed by the first Web server 20. The added value part 53 performs a process specific to the application by using the obtained information on the Cookie (step 109) and process ends.

The program executed at the server can use any technique such as Servlet or CGI other than JSP. A typical program executed at the Web browser 11 is JavaScript. If another programming language is developed to operate on many Web browsers in future, the new programming language can also be used. In order to change a set of Web sites to be provided with the same added value, only the Web sites to be added to or deleted from the set and a main Web server need to be changed. This process is executed by the domain registration processing part 24 shown in FIG. 3 and the result is stored in the registration domain information 26.

FIG. 6 is a diagram showing a method for writing a Cookie to be managed by the first Web server 20 from a Web page sent from the second Web server 30. The added value part 53 requests HTML, which contains a script program for writing a Cookie, from the first Web server 20 in the form of the HTTP request/HTTPS request to the first Web server 20 (step 201). A frame for the personal information management part 54 is designated as a target here. A value to be written in the Cookie is passed as a parameter. The first Web server 20 sends HTML, which contains a script program for writing a Cookie, to the personal information management part 54 in the form of HTTP response/HTTPS response (step 202). The personal information management part 54 confirms a user that the Cookie should be written or not (step 203). If the user does not confirms it, the flow for writing the Cookie ends here without saving the Cookie and the operation proceeds to the next process. If the user confirms it, the personal information management part 54 writes the Cookie (step 204), and the operation proceeds to the next process. When an unauthorized HTTP request/HTTPS request to write a Cookie is sent from a malicious Web site to the first Web server 20, the personal information management part 54 must not write the Cookie. For that purpose, the first Web server 20 may reference referrer field in the HTTP request, check whether the URL is for a previously registered domain or not, and if the URL is for a registered domain, the first Web server 20 writes a Cookie. A case can be considered, however, that the referrer field may be disguised with a bug of a Web browser or that a user may set a Web browser not to send the referrer field. Therefore, a reliable method is considered to display a dialog box in JavaScript before the Cookie is written for confirming a user that the Cookie should be saved. If a malicious site changes a Cookie, while a user is writing unimportant information such as magnification for zooming up in the Cookie, the change does not affect much. Thus, a process of confirming a user that the Cookie should be changed can be omitted in such a case. When important information such as personal information is treated by a Cookie, the Cookie should not be written in the manner shown in FIG. 6. For such a purpose, the Cookie is preferably written only from a particular Web site.

Figure 7:
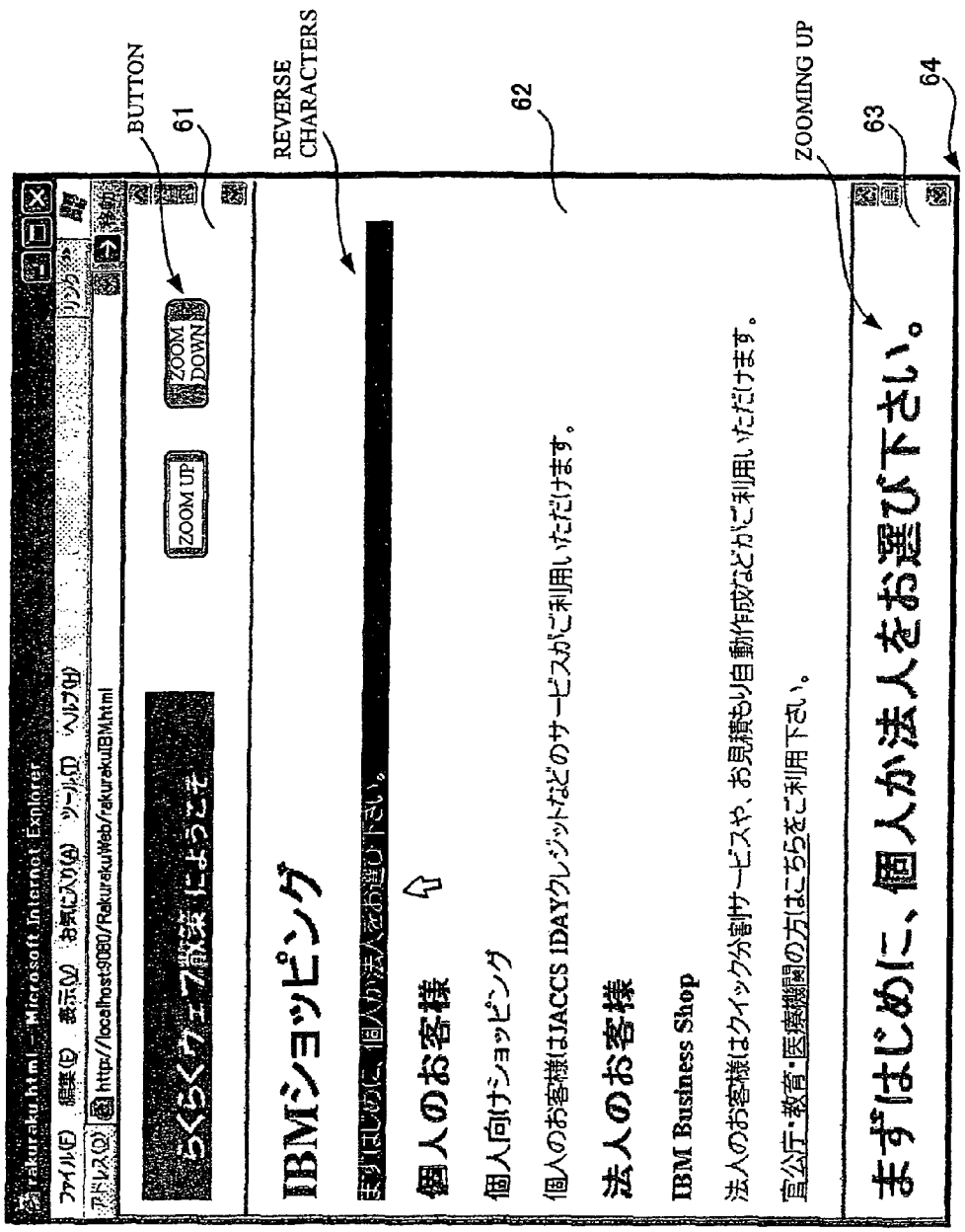
FIG. 7 is a diagram showing an example of displaying a Web page on a Web site with an added value of zooming characters on the Web browser.

Now, a specific example will be described. FIG. 7 is a diagram showing an example of displaying a Web page on a Web site with an added value of zooming characters on the Web browser 11. The example shown in FIG. 7 has four frames including three visible frames (a first frame 61, a second frame 62, and a third frame 63) and an invisible frame 64. The first frame 61 is a frame for a user to change magnification for zooming up characters and used by the added value part 53. The first frame 61 contains buttons for the added value (zoom up, zoom down) or the like as shown in the figure. The second frame 62 is a frame for displaying contents and used by the contents part 52. The second frame 62 displays original contents in this example. The third frame 63 is a frame for displaying an image processed with an added value and used by the added value part 53. The third frame 63 displays a zoomed up character string in this example. This Web page also has the fourth frame 64, which is invisible because the size is set to 0. The fourth frame 64 is used by the personal information management part 54. In the example shown in FIG. 7, when a mouse is placed on a predetermined character string in the second frame 62, the DOM element under there is displayed in reverse characters and zoomed in the third frame 63.

FIG. 8 is a diagram showing JSP codes for the example shown in FIG. 7. In the example shown in FIG. 8, HTML is generated by using a parameter of href. Generally, JSP is a mechanism for describing a process in the form of script in a HTML file, executing the script at the server side each time the Web browser requests it, replacing the script part in the HTML with the result of the process and sending it to the Web browser. The JSP shown in FIG. 8 is included in the first Web server 20, which is a main Web server, and the second Web server(s) 30, which are one or more subordinate servers. In FIG. 8, an event handler onload is set in FRAME tag of the contents part. The name of FRAME is passed as an argument of this event handler. In order to designate the contents, it is indicated in src attribute that a URL is passed as the parameter href. A script program to be referenced (JavaScript) needs not to be placed for each Web site. JavaScript referenced at a component 71 at the seventh line is placed on a single Web server (a particular Web site) such as the first Web server 20, for example, allowing a server to be selected from the first Web server 20 and the second Web servers. This component 71 indicates where the JavaScript code for registering a URL is. Then, a part shown at the eleventh line 72 is replaced. A particular Web site has the same original template, but can use JavaScript of the particular server by changing its description into that of the particular server.

If a page of a frame comes from the first Web server 20 with only the contents being that of the second Web server 30, information on the contents cannot be obtained by the conventional technique. That is to say, some conventional security models does not allow what character string is written in a place pointed with a mouse, for example, to be obtained from an external frame, if the Web servers are different. With the embodiment shown in FIG. 8, however, when a Web page provided from the first Web server 20 jumps to the second Web server 30, the page can be switched to access the contents of the second Web server 20 from JavaScript of the second Web server 30 by reloading the entire page from the second Web server 30. In the embodiment, when a page jumps across different domains, the Web page can obtain information on a character string written in the contents by JavaScript in a domain providing the Web page by reloading the entire page. This makes accessibility possible such as zooming up and reading aloud information only at the pointed place as well as zooming of the entire page or replacing the color of the entire page.

FIG. 9 is a diagram showing an example of JavaScript codes for registering a domain of a Web server with the same added value and a URL of JSP. FIG. 9 shows a part of the contents in a JavaScript file designated at the seventh line in FIG. 8. JavaScript codes shown in FIG. 9 are stored in registration domain information 26 of the first Web server 20 shown in FIG. 3. The example shown in FIG. 9 shows that w3.trl.ibm.com
w3.watson.ibm.com
w3.almaden.ibm.com are domains of Web servers with the same added value. This example shows that, Web pages in the domains are accessed by using the same added value through JSP http://w3.trl.
followed by: ibm.com/RakurakuWeb/
followed by: rakuraku.jsp and http://w3.watson.
followed by: ibm.com/RakurakuWeb/rakuraku.jsp and http://w3.almaden
followed by: .ibm.com/RakurakuWeb/
followed by: rakuraku.jsp respectively. For example, in order to access http://w3.
followed by: trl.ibm.com/ by using the same added value, http://w3.trl.
followed by: ibm.com/Rakurakuweb/
followed by: rakuraku.jsp?href
    =http://w3.trl
followed by: .ibm.com/ should be designated.

Figure 10:
FIG. 10 is a diagram showing JavaScript codes of an event handler onload set in FRAM tag in the contents part.

FIG. 10 is a diagram showing JavaScript codes of an event handler onload set in FRAME tag in the contents part. Among A tags for moving out from the current domain, tags for moving to Web pages on domains of the Web servers with the same added value are changed in href attribute so that they are provided with the same added value and target attribute is also changed to _top. CSS is also added to the contents to display DOM element of the contents part in reverse characters. Event handlers onmouseover and onmouseout are also set.

onmouseover codes will not be described in detail. The codes are for obtaining DOM element of a source of an event, setting a class for the DOM element and displaying it in reverse characters by using CSS, and also displaying the zoomed characters in the frame below.

onmouseout codes will not be described in detail either. The codes are for obtaining DOM element of a source of an event, releasing class setting, which is set for the DOM element to be displayed in reverse characters, and canceling to display zoomed up characters in the frame below. When a Web page has a link to anther Web page of the Web site to be provided with the same added value in the configurations shown in lines from the line third to the line ninth in FIG. 10, DOM is changed so that the page transfers to the URL, which provides the added value on the Web site, when the page is loaded in the frame. That is to say, when a new Web page is loaded in contentsFrame shown in FIG. 8, init shown in FIG. 10 is executed. All the A tags in this Web page are examined. The attribute of the A tags are changed by operating DOM so that a link to a page other than the current host page but to a page on a host that is defined as a Web site to be provided with the same added value is transferred to a URL, which provides an added value on the Web site.

In FIG. 10, splitText( ) is added as a component 81 for dividing a text if required.

Figure 11:
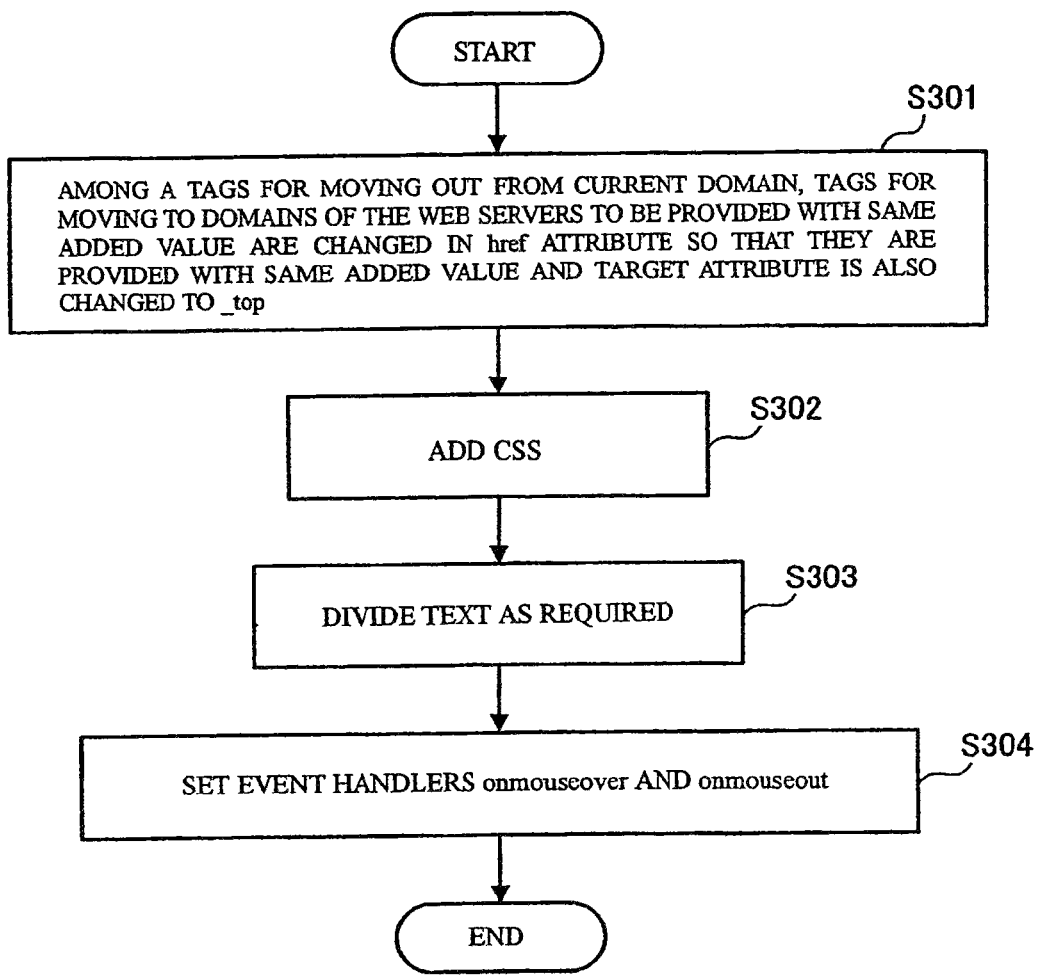
FIG. 11 is a flowchart for showing a flow of processes that originates the HTML shown in FIG. 10.

FIG. 11 is a flowchart for showing a flow of processes that originates the HTML shown in FIG. 10. Among A tags for moving out from the current domain, tags for moving to domains of the Web servers to be provided with the same added value are changed in href attribute so that they are provided with the same added value and target attribute is also changed to _top (step 301). CSS is added (step 302) and a text is divided as required (step 303). Then, event handlers onmouseover and onmouseout are set (step 304) and the process ends.

Figure 12:
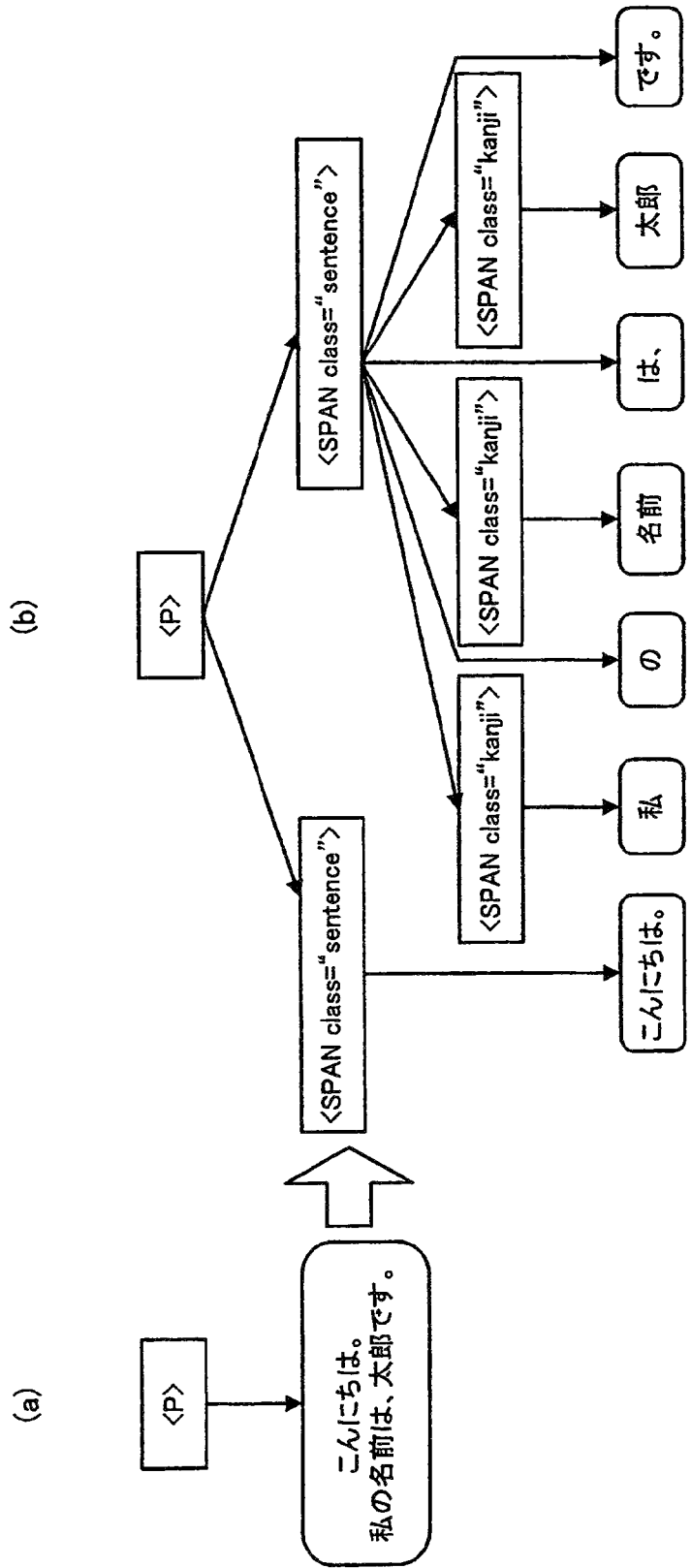
FIGS. 12 (*a*) and (*b*) are diagrams showing specific examples of dividing a text as required at step 303.

FIGS. 12 (*a*) and (*b*) are diagrams showing specific examples of dividing a text as required at step 303. In order to detect text where a mouse pointer is placed by more segmented unit than that for the original HTML, an SPAN tag is inserted as required. For purpose of the SPAN tag, an adequate class attribute is also added. The unit for inserting the SPAN tag and what kind of class attribute is used depend on the application. In the example shown in FIG. 12, each sentence is divided into SPAN tags and each Chinese character is made a child SPAN tag of the sentence SPAN tag. That is to say, the original sentence "Kon-nichi-ha (Hello). Watashi-no-namae-ha-Taro-desu (My name is Taro.)." as shown in FIG. 12 (*a*) is first divided into two sentences "Kon-nichi-ha" and "Watashi-no-namae-ha-Taro-desu" as shown in FIG. 12 (*b*). The second sentence "Watashi-no-namae-ha-Taro-desu" is divided by Chinese characters and Hiragana, with Chinese characters "Watashi", "namae" and "Taro" are made children SPAN tags of the sentence SPAN tag.

FIG. 13 is a diagram showing JavaScript codes of a function for obtaining a source of an event. Event handlers onmouseover and onmouseout require obtaining a source of an event to perform a process. As each Web browser has different method for obtaining a source of an event, codes shown here is required. JavaScript codes shown in FIG. 13 first determine whether mywindow.event can be used or not. If it can be used, myWindow.event.srcElement is made an event source. If it cannot be used, e.Target is made an event source, the source of the event is returned and the process ends. If an HTML element under a mouse pointer is divided into SPAN tags as shown in FIG. 12, the HTML element can be retrieved by more segmented unit than that for the original HTML.

Although accessibility is exemplified for an added value in the abovementioned embodiment, the added value can also be used for aiding a user in inputting personal information, for example. For example, if a user wants to buy goods at a commercial site, the user is asked to input information including name, street address, telephone number and the like. It is troublesome for the user to input this information each time the user buys goods. With the embodiment, however, the personal information is saved at a client as a Cookie and entries in a form can be automatically inputted. Such an aid for a user in inputting the personal information can be shared among previously registered Web sites. For example, when a user displays a registration page, fills required entries and presses Registration button to register the personal information, the personal information is written in the Cookie. When a user displays a page for inputting personal information at a Web site that uses the registered personal information, the Cookie is read in a method shown in FIG. 5. When the JavaScript is called at step 108 that is performed from the personal information management part 54 to the added value part 53, the user only needs to substitute values of called Cookie into elements of a form for the user to fill in personal information.

As another application, the present invention can be adapted to translate characters instead of zooming up them with the similar system as that shown in the embodiment. In this case, the sentence is inputted in <SPAN class="sentence"> tag shown in FIG. 12 in processing splitText ( ) shown by the component 81 in FIG. 10. This enables the sentence to be translated not only by each structure of the original HTML but also by each unit required by the application.

The present invention can also be adapted to apply for displaying Furigana (how to read the Chinese character) instead of zooming up characters with the similar system. Chinese characters are inputted in <SPAN class="kanji"> shown in FIG. 12 in processing splitText( ). This enables only the Chinese characters to be retrieved and added with Furigana.

The present invention can also be adapted to make a full description for an acronym or an abbreviation instead of zooming up characters with the similar system. The acronym or the abbreviation is inputted in <SPAN class="abbreviation"> tag in processing splitText ( )

As described in detail above, the embodiment can improve accessibility or add a new value (provide an added value) such as the abovementioned various types of applications with little change made to the existing Web site. The embodiment can also prevent the environment of a client from depending on a particular OS or a particular Web browser. Even if a page is transferred between related Web sites, the embodiment enables a user to use a new added value without requiring the user any trouble. The embodiment also enables information for personalization to be shared among related Web sites without saving the information on a server.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system comprising:
  a first server;
  at least one other server, the first server and the at least one other server being a computer apparatus and being configured such that a Web page is displayable on a Web browser in a client device connected with the first server and the at least one other server via a network;
  a registration module configured to register URLs (Uniform Resource Locators) of files providing an added feature for each of the first server and the at least one other server that are defined as a set of servers to be provided with a same added feature as in the first server;
  a display module configured to display existing Web pages of the first server and the at least one other server in the Web browser, and display the added feature on both a frame and a window on the Web Browser on the first server to provide said added feature to the Web page by manipulating an API (Application Program Interface) from another frame or another window, and to display the added feature twice on the at least one other server in the Web browser and at least once on the Web browser in the client device connected with the first server; and wherein the first server is configured to:
store a URL of a script program for providing domains of servers defined as a set to be provided with the added feature stored in memory of a particular computer apparatus that is the first server;
check whether or not a URL of the script program has been previously stored in the memory, sending an empty html to the Web browser on the condition that the URL of the script program is not previously stored in the memory, and sending a document file containing a script program for reading a cookie to the Web browser on condition that the URL of the script program has been previously stored in the memory,
   wherein an abbreviation found on the Web browser is displayed with a full description;
display a dialog box requesting user input and receiving the user input in response;
display the added feature at least once on the first server, and request a display of the added feature at least twice on the at least one other server; and
write a cookie representative of the user input.

2. The system according to claim 1, wherein the first server and the at least one other server change an attribute of "A" tag by operating a DOM (Document Object Model) such that a Web page is transferred to a URL that provides an added feature on another Web site in response to loading of the Web page into the frame, if the Web page has a link to a Web page of the another Web site to be provided with the same added feature, the system including:
   a selection module configured to select either the first server or the at least one other server to manage a cookie; and
   a sending module configured to send an access history between the web browser and the selected server using the cookie.

3. The system according to claim 1, wherein a particular server among the first server and the at least one other server manages a cookie, and wherein information for personalizing relating to the added feature accesses the cookie through the particular server.

4. A system including a first server comprising a computer apparatus, a storing module, and at least one other server, wherein:
   a first Web page is displayed on a Web browser in a client device connected with the first server and the at least one other server via a network;
   the storing module is configured to store in each of the first server and the at least one other server web contents specific to the first server and the at least one other server respectively, and to generate a document file using a frame to provide an added feature for the web contents;
   a second Web page sent from the at least one other server is displayed on both a frame for personal information management and the frame to provide added feature for the web contents;
   each sentence on the first Web page and the second Web page is divided into individual words;
   acronyms found on the first Web page and on the second Web page are displayed with a full description;
   the first server is configured to output an audio representation of an area on the first Web page selected by a mouse;
   the first server has a document file for the document file generated at the first server and the at least one other server to reference and able to cause the Web browser to implement an added feature on both a frame and a window on the Web browser on the first server; and
   the added feature for the web contents requests a script program for reading a cookie from the first server, and after receiving a response from the first server, requests a script program providing information on the cookie for the added feature from a second server
wherein the first server is configured to:
store a URL of a script program for providing domains of servers defined as a set to be provided with the added feature stored in memory of a particular computer apparatus that is the first server;
check whether or not a URL of the script program has been previously stored in the memory, sending an empty html to the Web browser on the condition that the URL of the script program is not previously stored in the memory, and sending a document file containing a script program for reading a cookie to the Web browser on condition that the URL of the script program has been previously stored in the memory,
   wherein each abbreviation found on the Web browser is displayed with a full description;
display a dialog box requesting user input and receiving the user input in response;
display the added feature at least once on the first server, and request display of the added feature at least twice on the at least one other server; and
write a cookie representative of the user input.

5. The system according to claim 4, wherein:
   the first server sends a document file containing the script program for reading a cookie to the Web browser if the URL passed from the Web browser as a parameter is for a domain previously registered as a set of servers to be provided with the same added feature;
   the first server and the second server select HTTP or HTTPS as a protocol for sending the added feature to a web site depending on a protocol used by the web site given an added feature; and
   an event handler simultaneously displays the added feature on multiple frames and multiple windows.

6. The system according to claim 5, wherein the at least one other server sends a document file containing a script program to the Web browser based on the information on a cookie passed from the Web browser as a parameter.

7. The system according to claim 4, wherein the added feature is for improving accessibility.

8. A main server comprising a computer apparatus within servers for providing a same added feature to Web browsers connected with a network, comprising:
   a storage module configured to store original web contents specific to a device;
   a generation module configured to generate a document file with a frame for providing the added feature; and a sending module configured to send a document file for a document file generated at the servers to reference and cause the Web browser to perform the added feature;
   a registration module configured to register domains of the servers defined as the set of servers to be provided with the added feature and a URL of a script program that provides the added feature;
   a determination module configured to:
      determine whether the URL passed from the browser as a parameter is one of those for previously registered domains of the servers or not,
      send an empty html to the Web browser on the condition that the URL of the script program is not registered, and send a document file containing a script program for reading a cookie to the browser on condition that the URL of the script program is registered; and a frame for personal information management which requires user confirmation before writing a cookie to the servers, wherein each sentence on the first Web page and the second Web page is divided into individual words, wherein each abbreviation found on the first Web page and the second Web page is displayed with a full description, wherein a Web page sent from one of the servers is displayed on both the frame for personal information management and the frame to provide added feature for the original web contents, and wherein the script program describes codes for reading the cookie and describes codes for sending the added feature to the URL as a parameter.

9. The server according to claim 8, wherein:

an event handler simultaneously displays the added feature on multiple frames and multiple windows; and the event handler uses a combination of visible and invisible frames for processing the added feature.

10. The server according to claim 8, further comprising a second sending module configured to send, in response to the reception of a request for a script program for writing the cookie from the Web browser that displays a Web page of another server composing the servers, a document file containing the script program for writing the cookie to the Web browser.

11. A method for providing a first added feature without modifying existing web contents in a system having servers connected with a Web browser via a network, the method comprising:

storing a URL of a script program for providing domains of servers defined as a set to be provided with the first added feature and a second added feature stored in memory of a particular computer apparatus that is one of the servers;

checking whether or not the URL of the script program passed from the Web browser as a parameter has been previously stored in the memory, sending an empty html to the Web browser on the condition that the URL of the script program is not previously stored in the memory, and sending a document file containing a script program for reading a cookie to the browser on condition that the URL of the script program has been previously stored in the memory, wherein each abbreviation found on the Web browser is displayed with a full description;

displaying a dialog box requesting user input and receiving the user input in response;

display the first added feature at least once on a first one of the servers, and display the first added feature at least twice on a second one of the servers; and writing a cookie representative of the user input.

12. The method according to claim 11, wherein the added feature referenced from document files of the servers and specific to an application is implemented on the Web browser; and the method includes:

selecting among the servers for managing the cookie; and sending an access history between the Web browser and the selected server using the cookie.

13. The method according to claim 11, the method including a sending step, in response to the reception of a request for a script program for writing a cookie from the Web browser that displays a Web page of another server that is one of the servers, of sending a document file containing the script program for writing the cookie to the Web browser.

14. A computer program product stored on a non-transitory computer storage medium for causing a computer apparatus functioning as a server for providing an added feature without modifying existing web contents in a system comprising servers connected with a Web browser via a network, the computer program product comprising computer readable program code configured to:

store a URL of a script program for providing domains of servers defined as a set to be provided with a same added feature with the added feature in memory of the computer apparatus;

create a cookie to store information about the added feature, wherein the script program includes codes for reading the cookie, and the script program includes codes for sending the added feature to the URL as a parameter; and check whether a URL passed from the Web browser as a parameter has been previously stored in the memory or not, sending an empty html to the Web browser on the condition that the URL of the script program is not previously stored in the memory, and if the URL has been previously stored in the memory, send a document file containing a script program for reading a cookie to the browser, wherein the Web browser performs initial processing including:

changing a link to a Web page with a same added feature;

dividing each sentence of text on the Web page into individual words;

adding cascading style sheets for dynamically changing a style of the Web browser; and setting an event handler for an added feature function, and simultaneously display the added feature on multiple frames and multiple windows in the Web browser on one of the servers, wherein one of the servers is configured to:

display an abbreviation found on the Web browser with a full description;

display a dialog box requesting user input and receiving the user input in response;

display the added feature at least once on one of the servers, and request display of the added feature at least twice on another one of the servers; and write a cookie representative of the user input.

15. The program product according to claim 14, including:

computer readable program code configured to cause the computer apparatus to send a document file containing the script program for writing the cookie to the Web browser in response to the reception of a request for a script program for writing the cookie from the Web browser that displays a Web page of another server composing the servers;

computer readable program code configured to select HTTP or HTTPS as a protocol for sending the added feature to a web site depending on a protocol used by the web site given an added feature.

16. A computer program product for causing a computer apparatus functioning as a first server for providing an added feature without modifying existing web contents in a system comprising servers connected with a Web browser via a network, the computer program product including a computer readable non-transitory storage medium having computer readable program code embodied therewith, the computer readable program code comprising computer readable program code configured to:

display an existing first Web page in the Web browser and provide the added feature to the first Web page by manipulating DOM from another frame or another window; and send a second Web page from a second server that is displayed on both a frame for personal information management and a frame to provide added feature for the web contents, wherein the second server includes a plurality of subordinate servers;

require user confirmation before writing a cookie to the first server;

simultaneously display the added feature on multiple frames and multiple windows in the Web browser on the first server;

output an audio representation of an area on the first Web page selected by a mouse;

use a combination of visible and invisible frames for processing the added feature; and if the Web page has a link to a Web page of the second server to be provided with the added feature, to change an attribute of "A" tag by manipulating DOM to transfer to a URL for providing the added feature on the another server in response to loading a Web page in a frame wherein the first server is configured to:

store a URL of a script program for providing domains of servers defined as a set to be provided with the added feature stored in memory of a particular computer apparatus that is the first server;

check whether or not a URL of the script program has been previously stored in the memory, sending an empty html to the Web browser on the condition that the URL of the script program is not previously stored in the memory, and sending a document file containing a script program for reading a cookie to the Web browser on condition that the URL of the script program has been previously stored in the memory, wherein an abbreviation found on the Web browser is displayed with a full description;

display a dialog box requesting user input and receiving the user input in response;

display the added feature at least once on the first server, and request display of the added feature at least twice on the second server; and write a cookie representative of the user input.

17. The server according to claim 8, including:

a registration module configured to register domains of the servers defined as the set of servers to be provided with the added feature and a URL of a script program that provides the added feature;

a second sending module configured to determine whether the URL passed from the browser as a parameter is one of those for previously registered domains of the servers or not, and to send a document file containing a script program for reading a cookie, which is provided by the server, to the browser on the condition that the URL is one of the previously registered domains; and a third sending module configured to send, in response to the reception of a request for a script program for writing the cookie from the Web browser that displays a Web page of another server composing the servers, a document file containing the script program for writing the cookie to the Web browser.

* * * * *